United States Patent
Kobayashi (10) Patent No.: US 7,145,842 B2
(45) Date of Patent: Dec. 5, 2006

(54) OBJECTIVE LENS MOVING CONTROL METHOD AND APPARATUS

(75) Inventor: Toshikazu Kobayashi, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 408 days.

(21) Appl. No.: 10/093,363

(22) Filed: Mar. 7, 2002

(65) Prior Publication Data
US 2002/0136103 A1    Sep. 26, 2002

(30) Foreign Application Priority Data
Mar. 9, 2001   (JP) ............................ 2001-066025

(51) Int. Cl.
*G11B 7/00* (2006.01)
(52) U.S. Cl. ............................. 369/44.11; 369/44.27; 369/44.29
(58) Field of Classification Search ............. 369/44.25, 369/53.28
See application file for complete search history.

(56) References Cited

U.S. PATENT DOCUMENTS 5,999,503 A * 12/1999 Tateishi et al. .......... 369/44.29
6,091,680 A * 7/2000 Matsuda et al. ......... 369/44.29
6,151,280 A * 11/2000 Naohara et al. ......... 369/44.27
6,246,646 B1 * 6/2001 Abe et al. ................ 369/44.27
6,370,093 B1 * 4/2002 Tada et al. ............... 369/44.25
6,724,697 B1 * 4/2004 Lee .......................... 369/44.27
6,747,943 B1 * 6/2004 Netsu et al. ................ 369/282
6,777,657 B1 * 8/2004 Nishio et al. ............. 250/201.5

FOREIGN PATENT DOCUMENTS

JP     10-143872    5/1998
JP     2000-155955  6/2000

* cited by examiner

Primary Examiner—Andrea Wellington
Assistant Examiner—Lixi Chow
(74) Attorney, Agent, or Firm—Katten Muchin Rosenman LLP (57) ABSTRACT

In a layer jump, a control signal based on a focus error signal is masked in a period based on a moving speed of an objective lens so as not to be influenced by an unnecessary light component. Thereafter, an observation of the control signal based on the focus error signal is restarted, and a brake signal is sent to the objective lens, and a focus servo is switched to the ON status. Thus, accuracy of the layer jump is improved when the unnecessary light component exists in an interlayer portion of the focus error signal.

13 Claims, 8 Drawing Sheets

RELATED ART

FIG.8

RELATED ART

OBJECTIVE LENS MOVING CONTROL METHOD AND APPARATUS

BACKGROUND OF THE INVENTION

1. Field of the Invention

The present invention relates to a drive unit for a multilayer recording optical disk, and particularly relates to a layer jump control technique for moving an objective lens in a focusing direction to perform a focus servo operation with respect to an arbitrary recording layer.

2. Background Art

In recent years, an optical disk called a DVD is used as a large capacity recording medium. A recording layer of the DVD is constructed by two layers at its maximum per one face, and data can be recorded to both faces. In the drive unit for such a multilayer recording optical disk, when regeneration, etc. of another layer are required in an operating state of the focus servo with respect to the recording layer being regenerated or recorded, it is, required to have a function (layer jump function) for controlling the distance of the objective lens with respect to the optical disk in the focusing direction so as to perform the focus servo operation with respect to this layer as an object.

In general, in the layer jump, the movement of the objective lens in the focusing direction is controlled by observing a focus error signal generated on the basis of reflected light from the recording layer of the optical disk.

Figure 6A:
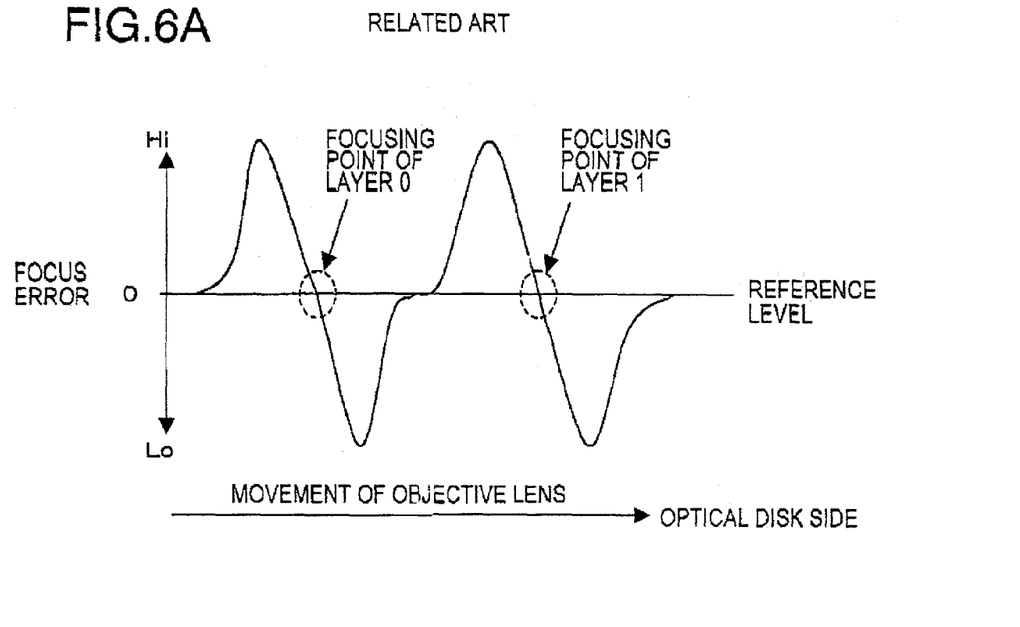
FIG. 6A is waveform diagram indicating examples of a focus error signal when the objective lens of the optical disk drive unit is moved until from a position far from the two-layer recording optical disk a position approaching a two-layer recording optical disk.

FIG. 6A is a waveform diagram of a standard focus error signal when the objective lens of the optical disk drive unit is moved from a position far from the two-layer recording optical disk until a position approaching the two-layer recording optical disk. In this figure, a focusing point of layer 0 shown by an arrow shows a position in which the objective lens is focused on the recording layer of a lower layer (layer 0). Further, a focusing point of layer 1 shows a position in which the objective lens is focused on the recording layer of an upper layer (layer 1).

As shown in this figure, when the objective lens begins to be moved from the position far from the optical disk, the standard focus error signal once has a peak in a high (Hi) direction, and the focusing point of layer 0 is set approximately when this standard focus error signal reaches a reference level. Thereafter, the standard focus error signal has a peak in a low (Lo) direction, and again passes through the reference level, and has a peak in the high (Hi) direction. The focusing point of layer 1 is set approximately when the standard focus error signal next reaches the reference level. When the objective lens is moved to a position near the optical disk, the standard focus error signal again has a peak in the low (Lo) direction.

Figure 7:
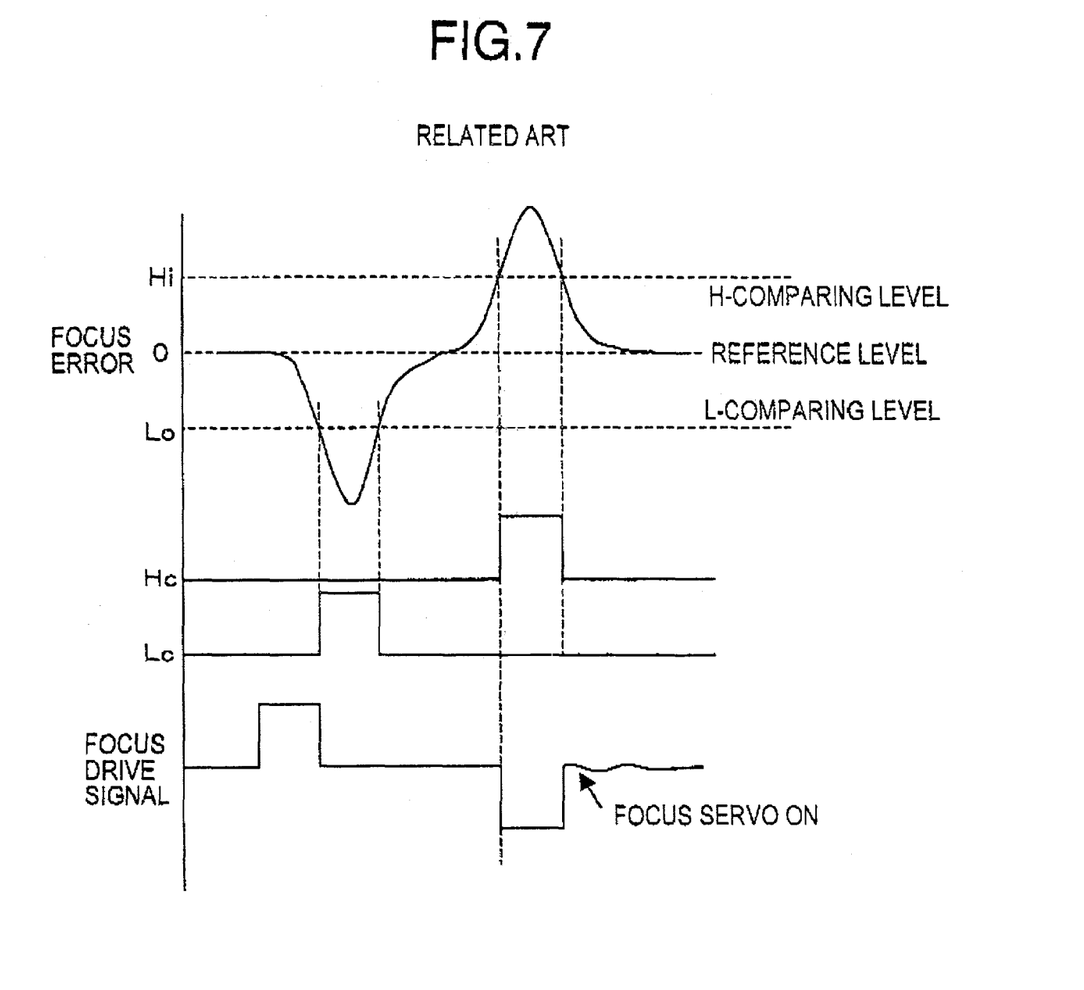
FIG. 7 is a view illustrating the relationship between a focus drive signal and a focus error signal.

FIG. 7 is a view for explaining processing for moving the objective lens on the basis of the focus error, signal in the case of a layer jump from layer 0 to layer 1.

In this figure, a high (H) comparing level and a low (L) comparing level are those of a reference signal compared with the focus error signal, and values (absolute value) of these comparing levels are set in advance. An Hc signal becomes a high (Hi) output when the value of focus error signal exceeds the high comparing level, and becomes a low (Lo) output in the other cases. On the other hand, an Lc signal becomes a high (Hi) output when the value of focus error signal exceeds an Lc comparing level or less, and becomes an low (Lo) output in the other cases.

A coil portion is arranged around the objective lens for converging a laser beam to the recording layer of the optical disk, and these members are supported by a spring so as to be vertically movable. When a kick voltage is applied to the coil as a focus drive signal, force in a direction for making the objective lens approach the optical disk is applied to the objective lens. In contrast to this, when a brake voltage is applied to the coil, force in a direction for making the objective lens separate from the optical disk is applied to the objective lens.

When the regeneration of layer 1 is required during the regeneration of layer 0, i.e., in an operating state of the focus servo with respect to layer 0, the drive unit applies the kick voltage after the drive unit turns off the focus servo. Thus the objective lens begins to be moved in the direction of the optical disk. The focus error signal is oscillated in the low (Lo) direction, and the Lc signal becomes the high level. Thereafter, it is returned to the high (Hi) direction, and the Lc signal becomes the low (Lo) level. Further, when the focus error signal is directed to the high (Hi) level and the Hc signal becomes the high (Hi) level, the movement of the objective lens is decelerated by applying the brake voltage. Thereafter, when the Hc signal becomes the low (Lo) level by passing through a peak, the application of the brake voltage is stopped. The focus servo is then turned on, and the focusing operation with respect to the layer 1 is performed, and the layer 1 begins to be regenerated.

Figure 6B:
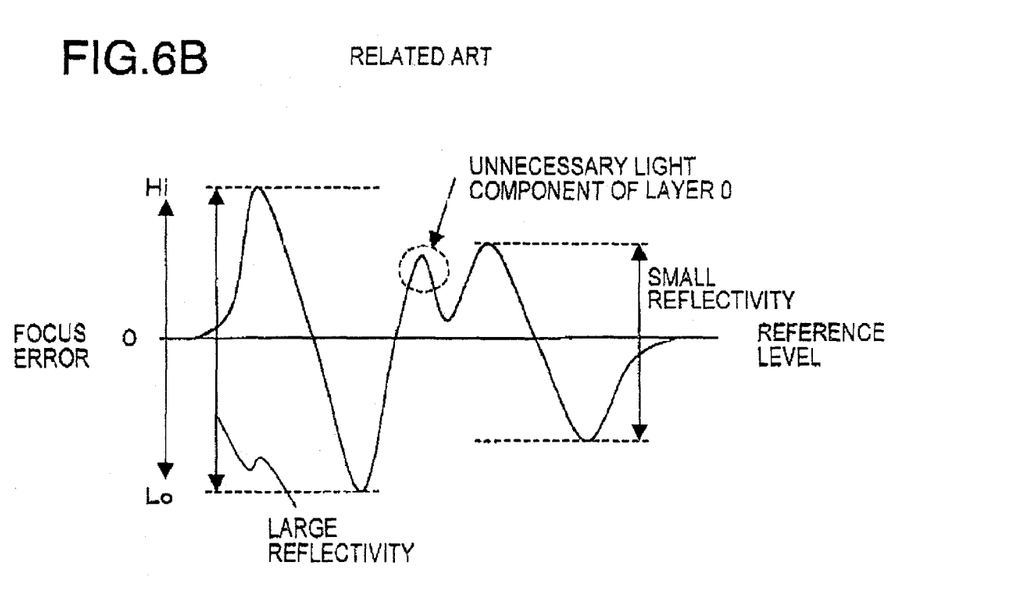
FIG. 6B is a waveform diagram which includes an unnecessary light component.

However, the focus error signal shown in FIG. 6A is an ideal signal. Accordingly, there is a case in which this focus error signal actually has an unnecessary light component. FIG. 6B is the focus error signal when there is a difference in reflectivity between adjacent layers, and a relatively large unnecessary light component is caused on the interlayer side of a layer of larger reflectivity. (In the example of this figure, the reflectivity of layer 0 is larger than that of layer 1, and the large unnecessary light component of layer 0 is caused on the side of layer 1. Conversely, a problem is also caused when the reflectivity of layer 1 is larger than that of layer 0, and the large unnecessary light component of layer 1 is caused on the side of layer 0.)

Figure 8:
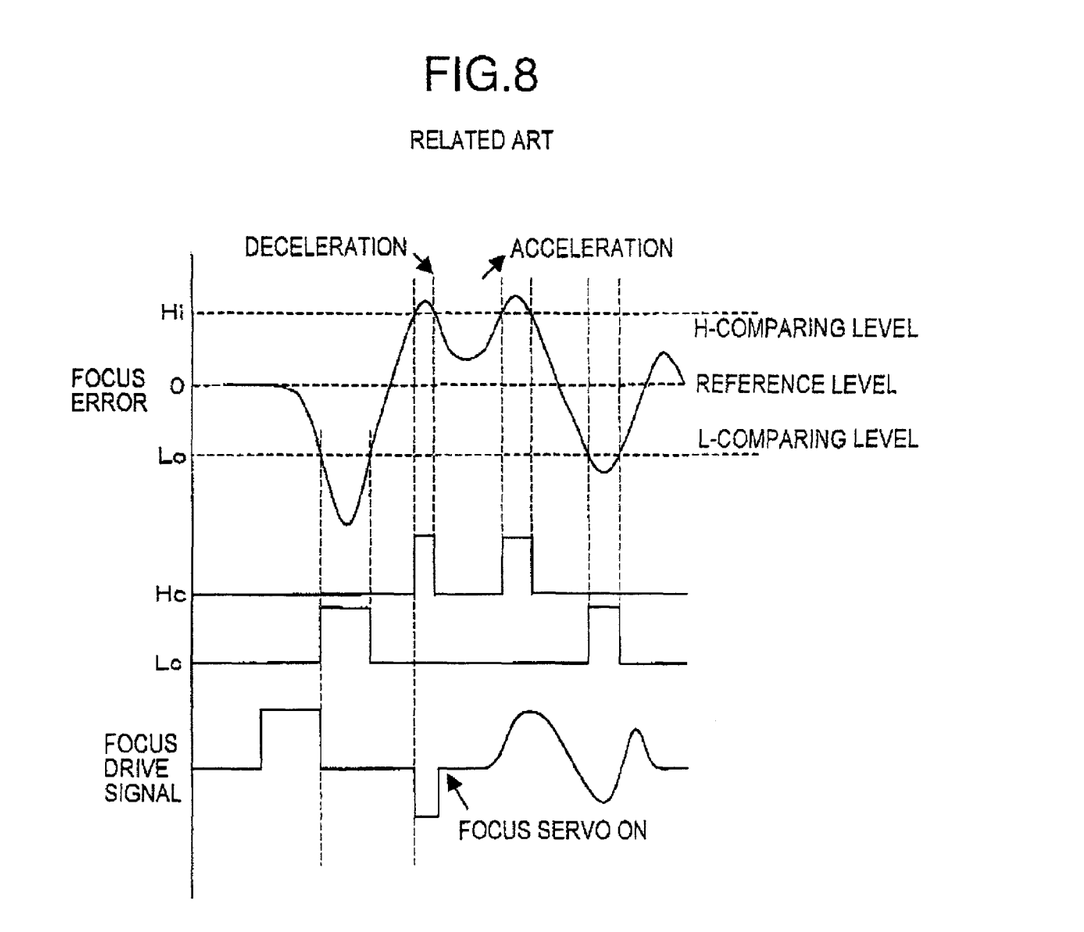
FIG. 8 is a view illustrating the relationship between a focus drive signal and a focus error signal, corresponding to FIG. 6B.

A problem caused in a layer jump from layer 0 to layer 1 will next be explained with reference to FIG. 8 when the focus error signal as shown in FIG. 6B is drawn. In the example of this figure, since the unnecessary light component of layer 0 exceeds the high (H) comparing level, the Hc signal becomes the high (Hi) level in an unnecessary light portion. Therefore, the drive unit decelerates the movement of the objective lens by applying the brake voltage. When the Hc signal then becomes the low (Lo) level, the focus servo is turned on although there is still a distance until a focusing position of layer 1. Thus, when the focus error signal is again oscillated in the high (Hi) direction, there is a case in which the drive unit further accelerates the moved objective lens and does not stop the focusing operation at the focusing point of layer 1 since the focus servo is turned on. As a result, there is a fear that the layer jump is unsuccessful.

SUMMARY OF THE INVENTION

An object of the present invention is to provide a technique for improving accuracy of the layer jump when an unnecessary light component exists in an interlayer portion of the focus error signal.

To solve the above problem, the invention provides an objective lens moving control method for controlling the movement of an objective lens in its focusing direction on the basis of a focus error signal corresponding to a focusing shift of the objective lens from a recording layer of a multilayer recording optical disk, the method comprising the steps of:

starting the approach of the objective lens to the recording layer to be, converged by a laser beam when there is a changing request of the recording layer to be converged by the laser beam emitted from the objective lens in reading of data recorded to the multilayer recording optical disk;

determining a time T in accordance with a moving speed of the objective lens; and starting braking of the objective lens after a time Tα obtained by multiplying the time T by a coefficient α predetermined has passed from a time point at which the value of focus error signal exceeds a first reference level predetermined and is then lower than the first reference level, and after a time point at which the value of focus error signal exceeds a second reference level predetermined.

DESCRIPTION OF THE PREFERRED EMBODIMENTS

Figure 1:
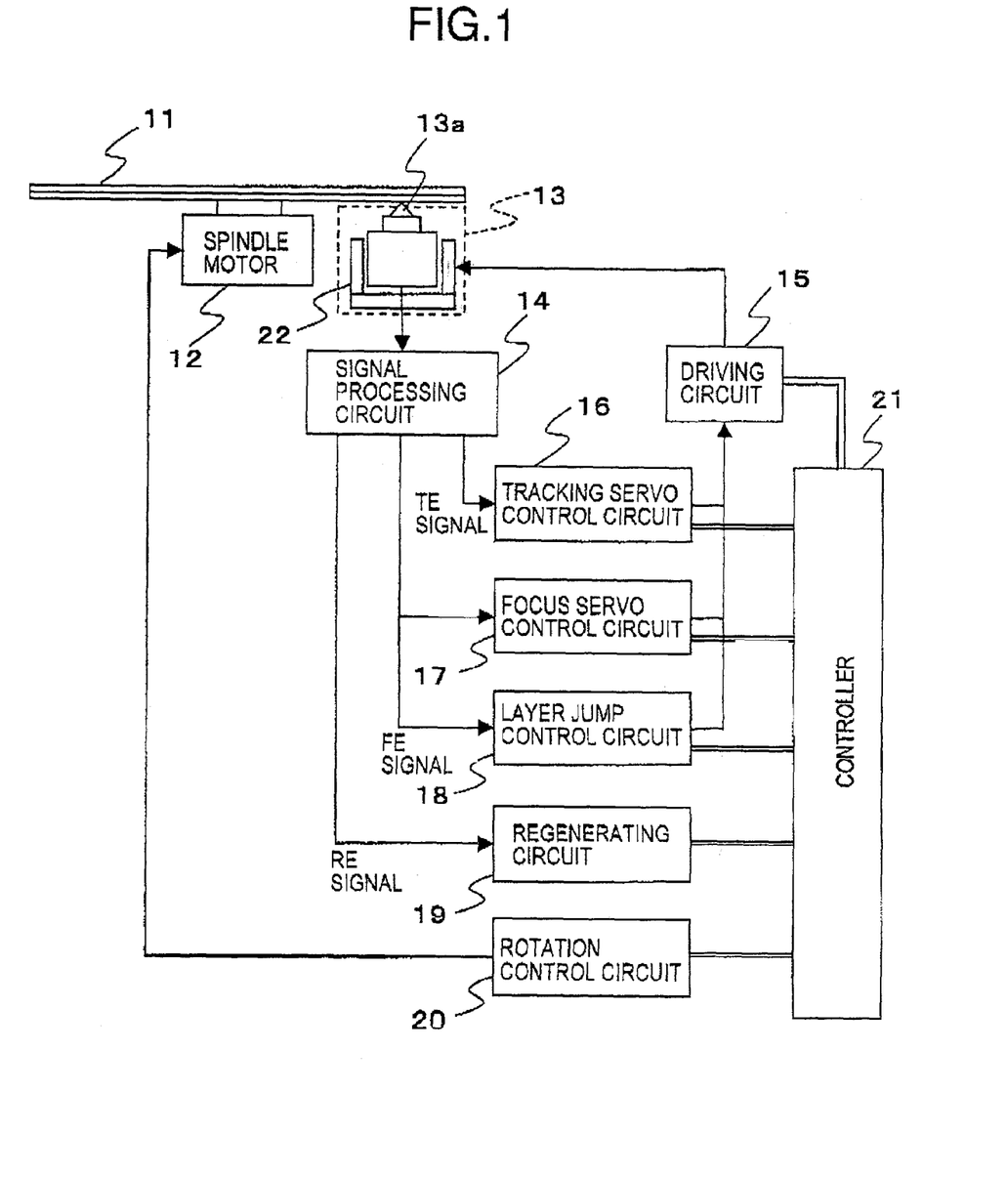
FIG. 1 is a block diagram showing a focus control mechanism of a multilayer recording optical disk drive unit.

Embodiment modes of the present invention will be explained with reference to the drawings. FIG. 1 is a block diagram showing a focus control mechanism of a multilayer recording optical disk drive unit. The multilayer recording optical disk drive unit is not limited to a dedicated device with the regeneration of an optical disk as an object, but also includes an information processor, an entertainment device, etc. having an optical disk regenerating/recording function.

As shown in this figure, the multilayer recording optical disk drive unit is constructed by including a spindle motor 12, an optical pickup 13 having an objective lens 13a, a signal processing circuit 14, a driving circuit 15, a tracking servo control circuit 16, a focus servo control circuit 17, a layer jump control circuit 18, a regenerating circuit 19, a rotation control circuit 20, and a controller 21. A recording circuit may be also arranged. In this embodiment, moving control of the optical pickup 13 in its focusing direction will be centrally explained. Therefore, the detailed explanations of a mechanism and a control circuit for moving the optical pickup 13 in a tracking direction, etc. are omitted.

In this multilayer recording optical disk drive unit, for example, the optical disk 11 such as a DVD-ROM having a multilayer recording structure is rotated by the spindle motor 12 on the basis of a rotating speed control signal from the rotation control circuit 20. A laser beam is emitted from the optical pickup 13, and is converged to a recording layer of the optical disk 11 by the objective lens 13a. Light reflected on the recording layer is read by the optical pickup 13. A read optical signal is converted to electric signals of a tracking error signal (TE signal), a focus error signal (FE signal), and a reflected light amount signal (RF signal) by the signal processing circuit 14. Here, the FE signal is a signal corresponding to a focusing shift of the objective lens 13a from the recording layer of the optical disk 11. For example, the FE signal can be generated by using a so-called astigmatic size method in which a spot shape of the reflected light is detected by arranging four divided photo detecting elements 13f in a light receiving portion of the optical pickup 13.

The optical pickup 13 has an actuator 22 for moving the objective lens 13a in the focusing direction and the tracking direction (a radial direction of the optical disk 11). The operation of the actuator 22 is independently controlled by a control signal from the driving circuit 15 with respect to each of the focusing direction and the tracking direction.

The TE signal is inputted to the tracking servo control circuit 16. The tracking servo control circuit 16 generates a signal for operating the actuator 22 in the tracking direction so as to make the laser beam follow a track oscillation on the basis of the TE signal, and outputs this generated signal to the driving circuit 15.

The FE signal is inputted to the focus servo control circuit 17 and the layer jump control circuit 18. The focus servo control circuit 17 generates a signal for operating the actuator 22 in the focusing direction so as to converge the laser beam to the recording layer of the optical disk 11 through the objective lens 13a on the basis of the FE signal, and outputs this generated signal to the driving circuit 15. When the layer jump control circuit 18 receives the request of a layer jump from the controller 21 described later, a kick voltage for moving a focusing point of the objective lens 13a to an object layer is generated in the driving circuit 15 as a focus drive signal by the layer jump control circuit 18. When the layer jump control circuit 18 monitors the FE signal and detects that the focusing point of the objective lens 13a is close to the object layer, a brake voltage for stopping the movement of the objective lens 13a is generated in the driving circuit 15 as the focus drive signal by the layer jump control circuit 18. The focus drive signal (the kick signal and the brake signal) generated by the driving circuit 15 is not limited to the voltage signal, but signals defined by an electric current and others can be also used as the focus drive signal. Further, orientations of the kick signal and the brake signal at a jumping time from a lower layer to an upper layer are reverse to those at a jumping time from the upper layer to the lower layer.

The RF signal is inputted to the regenerating circuit 19. The regenerating circuit 19 performs a predetermined demodulating operation with respect to data read in accordance with the RF signal, and then makes an error correction. The regenerating circuit 19 then performs processing such as analog conversion with respect to an obtained digital signal, and regenerates voice data, picture image data, etc.

The above respective processings are controlled by the controller 21 of the optical disk drive unit with respect to the driving circuit 15, the tracking servo control circuit 16, the focus servo control circuit 17, the layer jump control circuit 18, the regenerating circuit 19 and the rotation control circuit 20. For example, when the controller 21 receives the layer jump request by a control signal from the regenerating circuit 19 during the regeneration of the optical disk 11, the controller 21 sends instructions for turning-off a focus servo to the focus servo control circuit 17. The controller 21 then sends layer jump instructions to the layer jump control circuit 18. Thereafter, when the controller 21 receives a report of layer jump termination from the layer jump control circuit 18, the controller 21 sends instructions for turning-on the focus servo to the focus servo control circuit 17, and restarts the data reading of the optical disk 11 by using the regenerating circuit 19.

Figure 2:
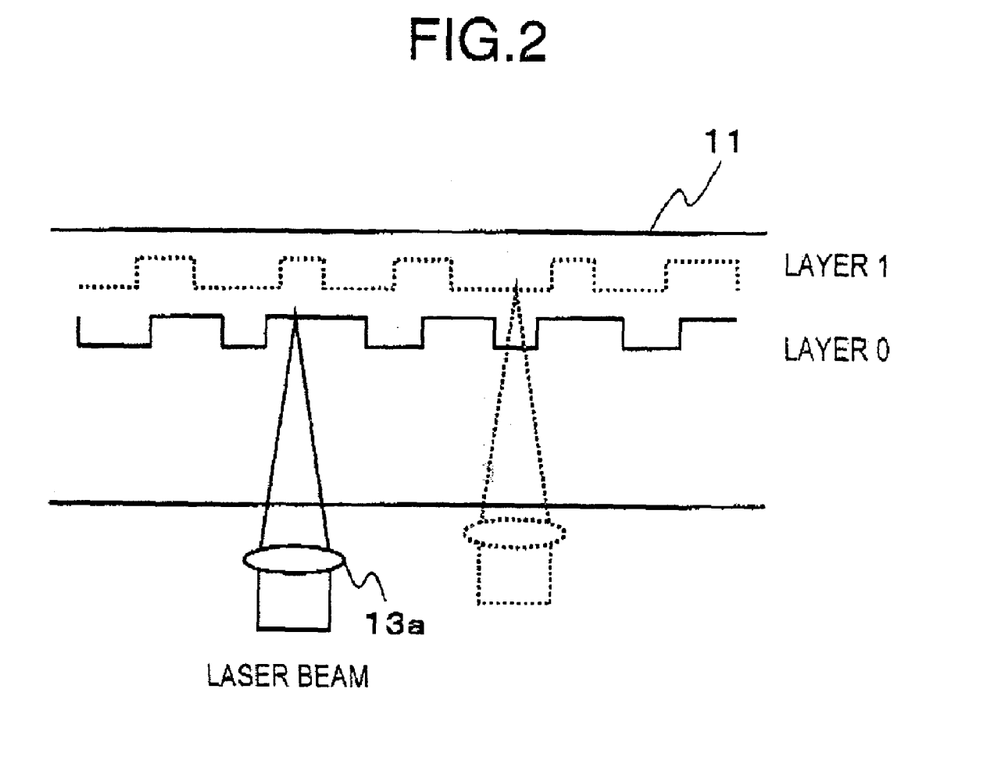
FIG. 2 is an explanatory view for explaining the construction of a multilayer recording optical disk.

In this example, the multilayer recording optical disk 11 is set to a two-layer structure having two recording layers as shown in FIG. 2. With respect to the two recording layers, a layer close to the objective lens 13*a* at a regenerating time is called layer 0, and a layer far from the objective lens 13*a* at the regenerating time is called layer 1. In this figure, the recording layer shown by a solid line is set to layer 0, and the recording layer shown by a broken line is set to layer 1. Similar to a CD-ROM, the size of an outer shape of the multilayer recording optical disk is set to e.g., 120 mm in diameter and 1.2 mm in thickness. However, the DVD-ROM is set to a structure in which two disks each having 0.6 mm in thickness are stuck to each other. The recording layer is set to two layers at its maximum per one face, and data can be recorded to both faces. Memory capacity is set to 4.7 G byte in one-layer record on one face, and is also set to 8.5 G byte in two-layer record on one face, and is also set to 9.4 G byte in one-layer record on both faces, and is also set to 17 G byte in two layer record on both faces. A track pitch is set to 0.74 μm, and the wavelength of a data reading laser is set to 650 nm. The structure of the optical disk able to be regenerated, etc, in the optical disk drive unit of the invention is not limited to this structure. For example, a structure of three layers or more may be also used. Further, the optical disk drive unit can be set such that the CD-ROM, etc. different from the DVD-ROM in the track pitch, the data reading laser wavelength, a coding method, etc. can be regenerated. Namely, the invention, can be applied in a wide range with respect to the layer jump at recording and regenerating times of the multilayer type recordable disk.

Polycarbonate resin having good light transmission, impact resistance, heat resistance, and humidity resistance properties is mainly used for a substrate of the optical disk 11. A reflecting film is formed by evaporating aluminum, etc. on the recording layer formed by arranging a pit on the substrate. Reflectivity of the reflecting film is set to e.g., about 80%. Further, a protecting film is formed by polycarbonate resin, etc. of the reflecting film.

Figure 3:
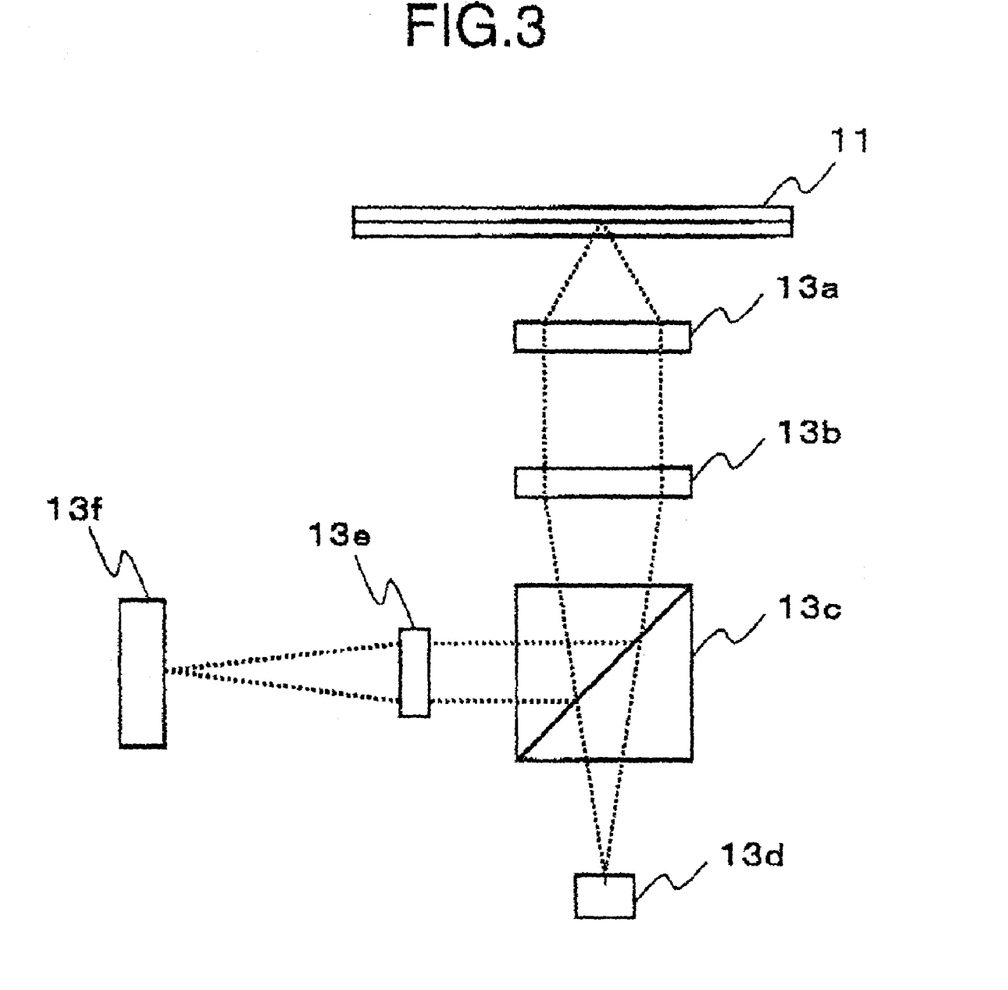
FIG. 3 is an optical path view for explaining the construction of an optical pickup.

Data are read from the optical disk 11 by the optical pickup 13. For example, as shown in FIG. 3, an optical system of the optical pickup 13 is constructed by arranging the objective lens 13*a*, a collimator lens 13*b*, a polarizing prism 13*c*, a semiconductor laser transmitter 13*d*, a cylindrical lens 13*e*, and a photo detecting element 13*f*. A laser beam emitted from the semiconductor laser transmitter 13*d* is straightly advanced in the polarizing prism 13*c*, and passes through the collimator lens 13*b*. Thereafter, the laser beam is converted to one of the recording layers of the optical disk 11 by the objective lens 13*a*. The reflected light from the optical disk 11 is reversely advanced, and passes through the collimator lens 13*b*. Thereafter, the reflected light is perpendicularly bent by the polarizing prism 13*c*, and is then incident to the photo detecting element 13*f* through the cylindrical lens 13*e*.

Figure 4:
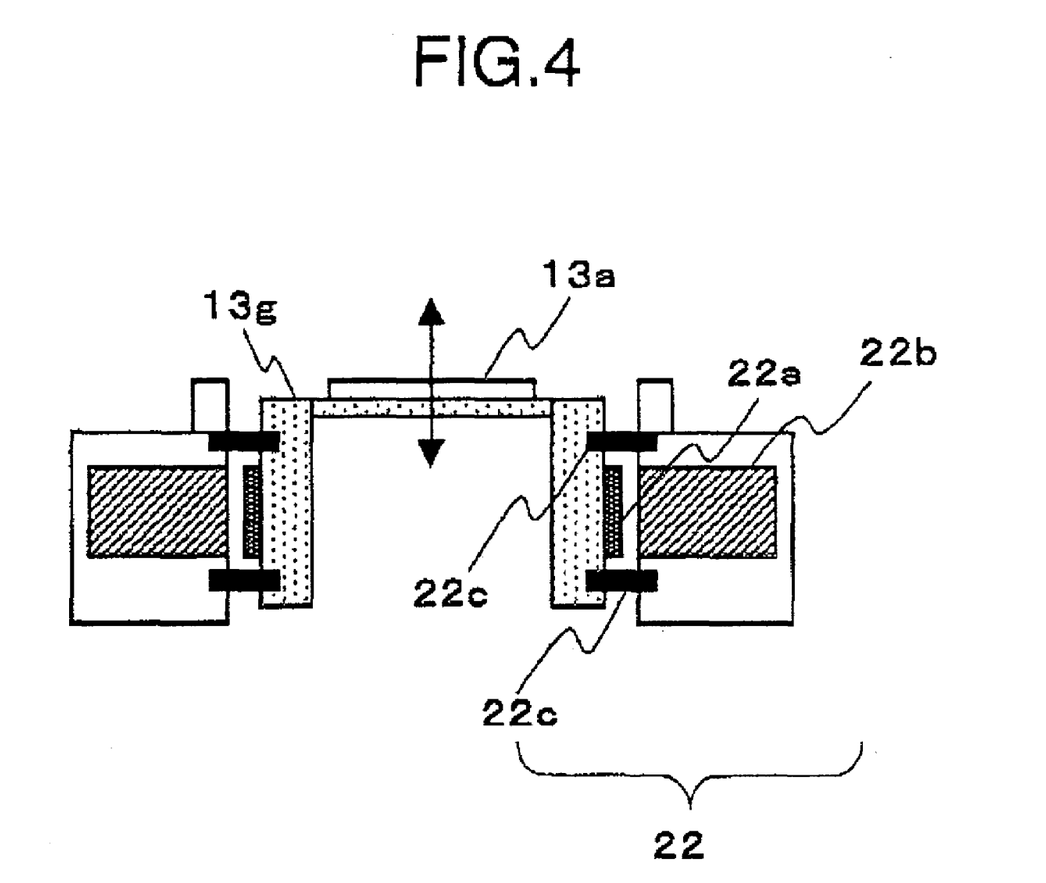
FIG. 4 is a view for explaining a mechanism for moving an objective lens 13a by an actuator 22 in a focusing direction.

FIG. 4 is a view for explaining a mechanism for moving the objective lens 13*a* in the focusing direction by the actuator 22. The objective lens 13*a* is supported by a support spring 22*c* of the objective lens, through an objective lens fixture 13*g* so as to be displacable upward and downward, and leftward and rightward. A coil 22*a* for focus is arranged around the objective lens; 13*a*. Further, a magnet 22*b* is arranged outside the coil 22*a* for focusing. When a voltage for control (the kick voltage and the brake voltage) is supplied to the coil 22*a* for focusing, driving force in the focusing direction is applied to the objective lens 13*a* as shown by an arrow of FIG. 4 in accordance with an orientation of this voltage.

The processing operation of a layer jump control mechanism of this embodiment mode in the above construction will be explained with reference to a waveform diagram shown in FIG. 5. For example, the optical disk drive unit can perform the following processing operation on the basis of a control program assembled in advance.

Here, the case of a layer jump from layer 0 to layer 1 is set to an example when an unnecessary light component exists on the side of layer 1 with respect to the FE signal of layer 0.

For example, it is known that there is a case in which the unnecessary light component is caused by a CD side component of the objective lens 13*a* when the objective lens 13*a* copes with both the CD and the DVD. It is also known that there is a case in which the unnecessary light component is caused in principle in the detection of a focus error when a so-called spot size method is used. Further, it is considered that there is also a case in which there is a generating cause proper to the optical disk due to a bad S/N, etc.

On the other hand, as features of the unnecessary light component, it has been ascertained that the unnecessary light component is generated in a place approximately at a constant distance from one side or the other side of a recording face of the optical disk.

Therefore, to avoid an influence of this unnecessary light component, it is considered that it is sufficient to perform the brake processing and turn on the focus servo in the layer jump after the place of the unnecessary light component. Namely, the Hc signal is masked for a probable time of the generation of the unnecessary light component such that no Hc signal becomes the high (Hi) level by reacting on the unnecessary light component.

However, a moving speed of the objective lens 13*a* with respect to the optical disk 11 during the layer jump is changed every time by sensitivity of the biaxial actuator 22, a face vibration of the rotating optical disk 11, etc. Therefore, no masking time of the Hc signal can be uniquely determined. According, in this embodiment mode, the masking time of the Hc signal is set on the basis of a time of the FE signal exceeding a certain reference level e.g., a low (L) comparing level, i.e., a time T at which the Lc signal is at a high (Hi) level. At this time, the time T is a value according to the moving speed of the objective lens 13*a*.

The L-comparing level is originally a reference signal used to control the focus drive signal, but is used in a reference signal for the Hc signal mask in this embodiment mode. No reference signal for the Hc signal mask is naturally limited to the L-comparing level.

For example, the masking time of the Hc signal can be set to a time interval of $\alpha T$ after the Lc signal becomes the low (Lo) level. Here, for example, the coefficient $\alpha$ can be set to 0.9, etc., and is determined in advance on the basis of an experiment, a simulation, etc.

Thus, the masking time can be set every layer jump with the moving speed of the objective lens 13*a* in a state at that time as a reference. Therefore, an individual difference of the optical disk 11, a peripheral environment, a sensitivity difference of the biaxial actuator, etc. can be absorbed.

Figure 5:
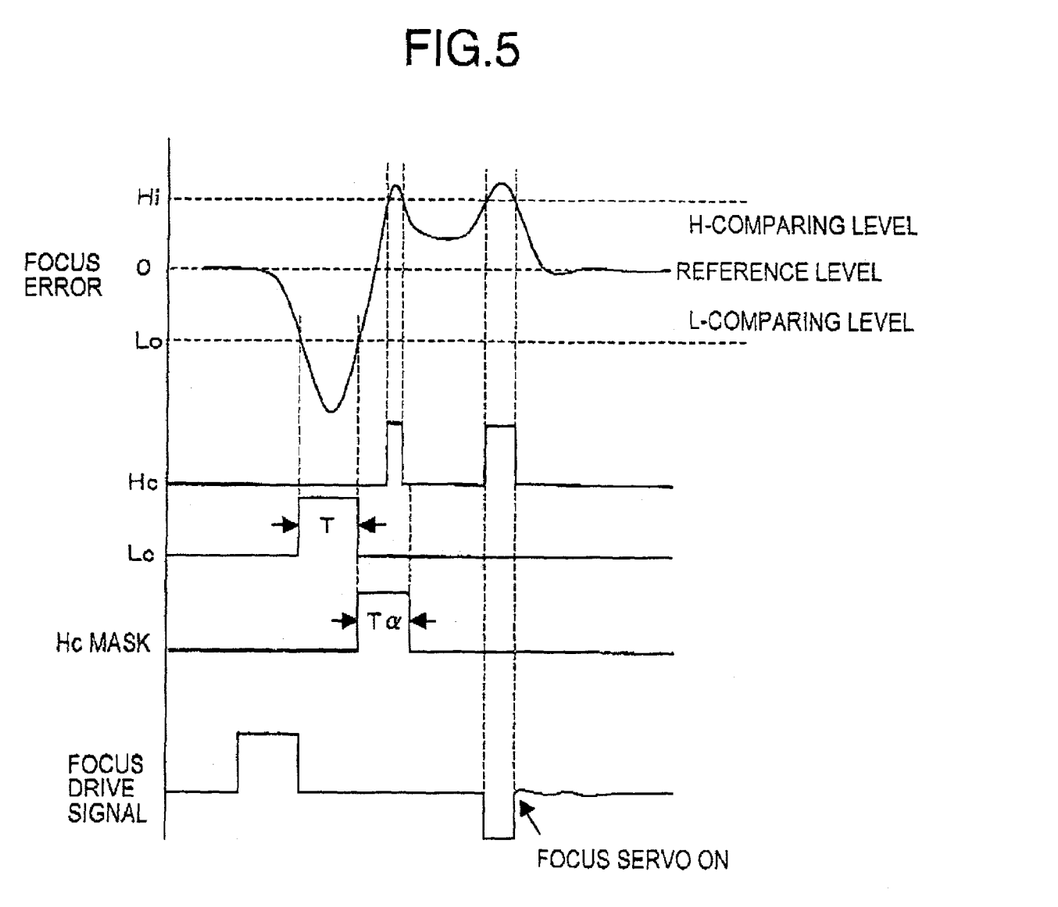
FIG. 5 is a view for explaining a layer jump in the present invention.

In FIG. 5, when the regeneration of layer 1 is required during the regeneration of layer 0, i.e., in an operating state of the focus servo with respect to layer 0, the drive unit applies the kick voltage as the focus drive signal after the drive unit turns off the focus servo. Thus, the objective lens 13a begins to be moved in the optical disk direction.

The layer jump control circuit 18 measures the time T of a period in which the Lc signal has a high (Hi) output, i.e., the value of FE signal exceeds (the value of) the L-comparing level. The Hc signal is masked by generating e.g., an Hc mask signal for the period of α T from a time point at which the Lc signal has become the low (Lo) level. Therefore, the layer jump control circuit 18 can neglect the high (Hi) state of the Hc signal due to the unnecessary light component.

When the Hc signal becomes the high (Hi) level after the masking period, the layer jump control circuit 18 decelerates the movement of the objective lens by applying the brake voltage. Thereafter, when the Hc signal becomes the low (Lo) level, the application of the brake voltage is stopped and the focus servo is turned on. As a result, the focus servo can be turned on in an original position so that a focusing point of the objective lens 13a can be moved to the layer 1. The regeneration of layer 1 is then started.

Thus, in accordance with this embodiment mode, it is possible to succeed in the layer jump even when a large unnecessary light component exists in an interlayer portion of the FE signal.

The invention can be also applied to the case of a layer jump from layer 1 to layer 0 when the unnecessary light component exists on the side of layer 0 with respect to the FE signal of layer 1. In this case, since the unnecessary light component is caused in a low (Lo) direction, the time T is measured with e.g., the high (H) comparing level as a reference, and the Lc signal is masked on the basis of this time T.

Further, if dispersion of the time T is small, the time T is measured e.g., at the beginning of the regeneration of the optical disk 11, and the masking time may be also set in this regeneration with the firstly measured time T as a reference.

Each processing of the above optical disk unit can be controlled on the basis of e.g., programs of a driver firmware, etc. Such programs can be stored to a memory device arranged within the optical disk unit. Further, a program for control is recorded in advance to a recording medium such as an optical disk, and can be also set to be read into the optical disk unit in accordance with necessity.

The layer jump control in the invention can be also applied to the optical disk of a layer structure of three layers or more as well as the optical disk of a two-layer structure. Further, in the above example, the processing at a regenerating time is explained, but the invention can be also applied to processing at a recording time.

As mentioned above, in accordance with the invention, accuracy of the layer jump can be improved when the unnecessary light component exists in an interlayer portion of the FE signal.

What is claimed is:

1. An objective lens moving control method for controlling the movement of an objective lens in its focusing direction on the basis of focus error signal corresponding to a focusing shift of the objective lens from a recording layer of a multilayer recording optical disk, the merhud comprising the steps of:

detecting a changing request of a recording layer to be converged by the laser beam emitted from the objective lens;

starting the approach of the objective lens so the recording layer to be converged by a laser beam;

determining a time T in accordance with a moving speed of said objective lens;

calculating a masking time based on the time T;

not starting braking of said objective lens by masking signals indicating that an absolute value of a focus error signal exceeds a predetermined second reference level during the masking time from a time point at which the absolute value of the focus error signal becomes lower than a predetermined first reference level for a first time after exceeding the first reference level, and starting braking of the objective lens when the absolute value of the focus error signal exceeds the second reference value after the masking time has passed.

2. An objective lens moving control method according to claim 1, wherein said time T is a time until the absolute value of the focus error signal is lower than said first reference level for the first time after the focus error signal exceeds said first reference level.

3. An objective lens moving control method according to claim 1, further comprising:

focusing onto the recording layer in be converged by the laser beam after the braking of said objective lens is terminated.

4. An objective lens moving control method according to claim 2, further comprising focusing onto the recording layer to be converged by the laser beam after the braking of said objective lens is terminated.

5. An objective lens moving controller for controlling the movement of an objective lens in its focusing lens on the basis of a focus error signal corresponding to a focusing shift of the objective lens from a recording layer of a multilayer recording optical disk, the controller comprising:

detecting means which detects a changing request of a recording layer to be converged by the laser beam emitted from the objective lens; and controlling means; wherein, when said detecting means detects said changing request, said controlling means starts the approach of the objective lens to the recording layer to be converged by a laser beam, determines a time T in accordance with a moving speed of said objective lens, calculates a masking time based on the time T, does not start braking of the objective lens by masking signals indicating that an absolute value of a focus error signal exceeds a predetermined second reference level during the masking time from a time point at which the absolute value of the focus error signal becomes lower than a predetermined first reference level for a first time after exceeding the first reference level, and starts braking of said objective lens when the absolute value exceeds the second reference value after the masking time has passed.

6. An objective lens moving controller according to claim 5, wherein said time T is a time until the obsolete value of the focus error signal is lower than said first reference level for the first time after the focus error signal exceeds said first reference level.

7. An objective lens moving controller according to claim 5, wherein the objective lens moving controller further comprises focus leading-in means for moving a focal point of said objective lens onto the recording layer to be converged by the laser beam, and said control means moves the focal point onto the recording layer to be converged by the laser beam after the braking of said objective lens is terminated.

8. An objective lens moving controller according to claim 6, wherein the objective lens moving controller further comprises focus leading-in means for moving a focal point of said objective lens onto the recording layer to be converged by the laser beam, and said control means moves the focal point onto the recording layer to be converged by the laser beam after the braking of said objective lens is terminated.

9. An optical disk drive unit comprising an objective lens moving controller according to claim 5.

10. An optical disk drive unit comprising an objective lens moving controller according to claim 6.

11. An optical disk drive unit comprising an objective lens moving controller according to claim 7.

12. An optical disk drive unit comprising an objective lens moving controller according to claim 8.

13. A recording medium recording an executable program which can be executed in an objective lens moving controller which controls the movement of an objective lens in its focusing direction on the basis of a focus error signal corresponding to a focusing shift of the objective lens from a recording layer of a multilayer recording optical disk, the program executing:

processing for receiving a changing request of the recording layer to be converged by the laser beam emitted from the objective lens;

processing for starting the approach of the objective lens to the recording layer to be converged by a laser beam;

processing for determining a time T in accordance with a moving speed of said objective lens;

processing for calculating a masking time based on the time T;

not starting braking at said objective lens by masking signals indicating that an absolute value of a focus error signal exceeds a predetermined second reference level during the masking time from a time point at which the absolute value of the focus error signal becomes lower than a predetermined first reference level for a first time after exceeding the first reference level; and starting braking of said objective lens when the absolute value exceeds the second reference value after the masking time has passed.

* * * * *